US008489592B2

(12) United States Patent  (10) Patent No.: US 8,489,592 B2
Lee et al.  (45) Date of Patent: Jul. 16, 2013

(54) ELECTRONIC DEVICE AND METHOD FOR SEARCHING RELATED TERMS

(75) Inventors: Chung-I Lee, New Taipei (TW);
Chien-Fa Yeh, New Taipei (TW);
Cheng-Feng Tsai, New Taipei (TW);
Gen-Chi Lu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/246,871

(22) Filed: Sep. 28, 2011

(65) Prior Publication Data
US 2012/0215792 A1  Aug. 23, 2012

(30) Foreign Application Priority Data

Feb. 18, 2011  (TW) .............................. 100105329 A

(51) Int. Cl.
*G06F 7/00* (2006.01)
*G06F 17/30* (2006.01)

(52) U.S. Cl.
USPC ........................................... 707/729; 707/758

(58) Field of Classification Search
None
See application file for complete search history.

(56) References Cited

U.S. PATENT DOCUMENTS

| 6,006,223 | A * | 12/1999 | Agrawal et al. ............... 704/251 |
| 6,308,172 | B1 * | 10/2001 | Agrawal et al. ....................... 1/1 |
| 6,400,681 | B1 * | 6/2002 | Bertin et al. ................... 370/218 |
| 6,732,088 | B1 * | 5/2004 | Glance ..................................... 1/1 |
| 8,131,754 | B1 * | 3/2012 | Lawrence et al. ............. 707/771 |
| 2002/0007364 | A1 * | 1/2002 | Kobayashi et al. ........... 707/203 |
| 2004/0172558 | A1 * | 9/2004 | Callahan et al. .............. 713/201 |
| 2006/0136405 | A1 * | 6/2006 | Ducatel et al. ..................... 707/4 |
| 2007/0203924 | A1 * | 8/2007 | Guha et al. ..................... 707/100 |
| 2008/0027921 | A1 * | 1/2008 | Chandrasekar et al. .......... 707/4 |
| 2008/0104093 | A1 * | 5/2008 | Wake ............................. 707/101 |
| 2008/0140348 | A1 * | 6/2008 | Frank ............................ 702/181 |
| 2009/0119285 | A1 * | 5/2009 | Sundaresan et al. ............. 707/5 |
| 2009/0319518 | A1 * | 12/2009 | Koudas et al. .................... 707/5 |
| 2010/0235337 | A1 * | 9/2010 | Shanahan et al. ............. 707/705 |
| 2010/0325148 | A1 * | 12/2010 | Anderson ..................... 707/769 |

OTHER PUBLICATIONS

Temporal slicing in the evaluation of XML queries, Gao et al., Proceedings of the 29th VLDB Conference, Berlin, Germany, 2003.*
How to time-stamp a digital document, Haber et al., LNCS 537, pp. 437-455, 1991.*
TimedTextRank: adding the temporal dimension to multi-document summarization, Wan et al., Proceedings of SIGIR , pp. 867-868, 2007.*
Finding Topic Words for Hierarchical Summarization, Lawrie et al ., Proceedings SIGIR, pp. 349-357, 2001.*
Clustering and Exploring Search Results using Timeline Constructions, Alonso et al, CIKM, pp. 97-106, Nov. 2-6, 2009.*
Web Page Publication Date Extraction and Application, Chen et al., Journal of COmputational Information System, 6(1), pp. 279-285, 2010.*
On the Value of Temporal Information in Information Retrieval, Alonso et al., ACM SIGIR Forum, 41(2), pp. 35-41, Dec. 2007.*

* cited by examiner

*Primary Examiner* — Augustine K Obisesan
(74) *Attorney, Agent, or Firm* — Altis Law Group, Inc.

(57) ABSTRACT

The present disclosure provides a method for searching related terms using an electronic device. The method adds time stamps to one or more electronic documents, and obtains related terms by calculating a relevance score between every two terms of the electronic documents within a specified time range. The method further calculates a time gap between each related term and a preset query term, obtains updated related terms that have a time relationship with the preset query term by removing specified related terms whose time gap is greater than a preset value, and obtains search results from a data source by performing a search operation according to the updated related terms.

16 Claims, 4 Drawing Sheets

ELECTRONIC DEVICE AND METHOD FOR SEARCHING RELATED TERMS

BACKGROUND

1. Technical Field

Embodiments of the present disclosure relate to file searching technology, and particularly to an electronic device and method for searching related terms using the electronic device.

2. Description of Related Art

With current internet search technologies, related terms of a user-input query term are obtained by calculating a relevance score between a plurality of terms or querying a dictionary (e.g., WordNet). However, with this technology, the obtained related terms have no relationship with the time of the related terms.

For example, suppose that a query term is "hadoop," the related terms of "hadoop" may include "hadoop-0.18," "hadoop-0.19," and "hadoop-0.20." Supposing that "hadoop-0.20" represents the latest technology about cloud computing, "hadoop-0.18" represents the former technology (e.g., two years ago). If the user wants to find electronic documents about cloud computing two years ago, it is inefficient to select the electronic documents from the mass information of the search results. With this technology, the search results are predefined by the system and user-specified interests have no impact on the ranking of the results because the related terms determined by the system have no consideration with the time coefficient. Therefore, a more efficient method for searching related terms is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
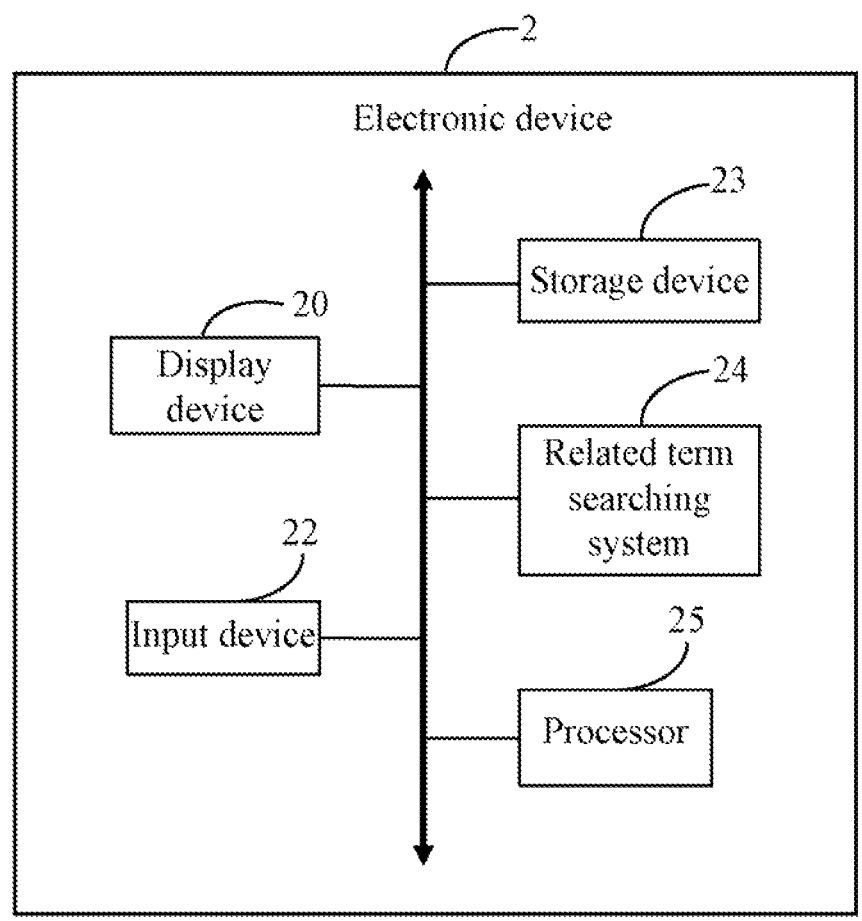
FIG. 1 is a block diagram of one embodiment of an electronic device including a related term search system.

FIG. 1 is a block diagram of one embodiment of an electronic device 2 including a related term searching system 24. In the embodiment, the electronic device 2 further includes a display device 20, an input device 22, a storage device 23, and at least one processor 25. The related term searching system 24 may be used to determine related terms that have a time relationship with a preset query term stored in the storage device 23. A detailed description will be given in the following paragraphs.

The display device 20 may be used to display search results matched with the determined related terms, and the input device 22 may be a mouse or a keyboard used to input computer readable data.

Figure 2:
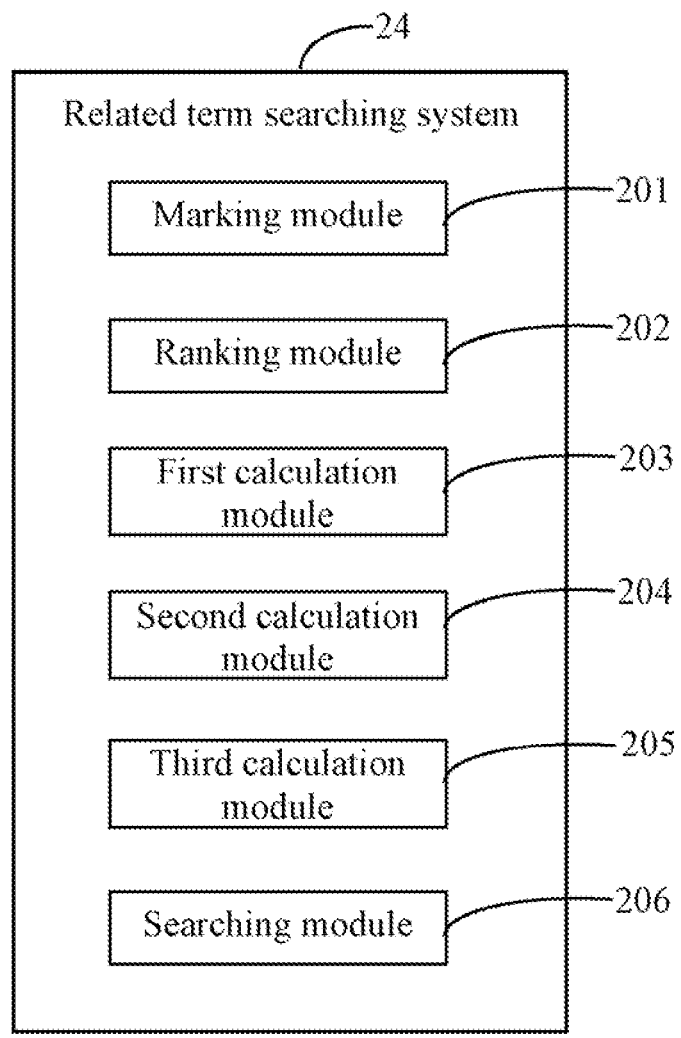
FIG. 2 is a block diagram of function modules of the related term search system included in the electronic device of FIG. 1.

FIG. 2 is a block diagram of function modules of the related term searching system 24 in the electronic device 2. In one embodiment, the related term searching system 24 may include one or more modules, for example, a marking module 201, a ranking module 202, a first calculation module 203, a second calculation module 204, a third calculation module 205, and a searching module 206. The one or more modules 201-206 may comprise computerized code in the form of one or more programs that are stored in the storage device 23 (or memory). The computerized code includes instructions that are executed by the at least one processor 25 to provide functions for the one or more modules 201-206.

Figure 3:
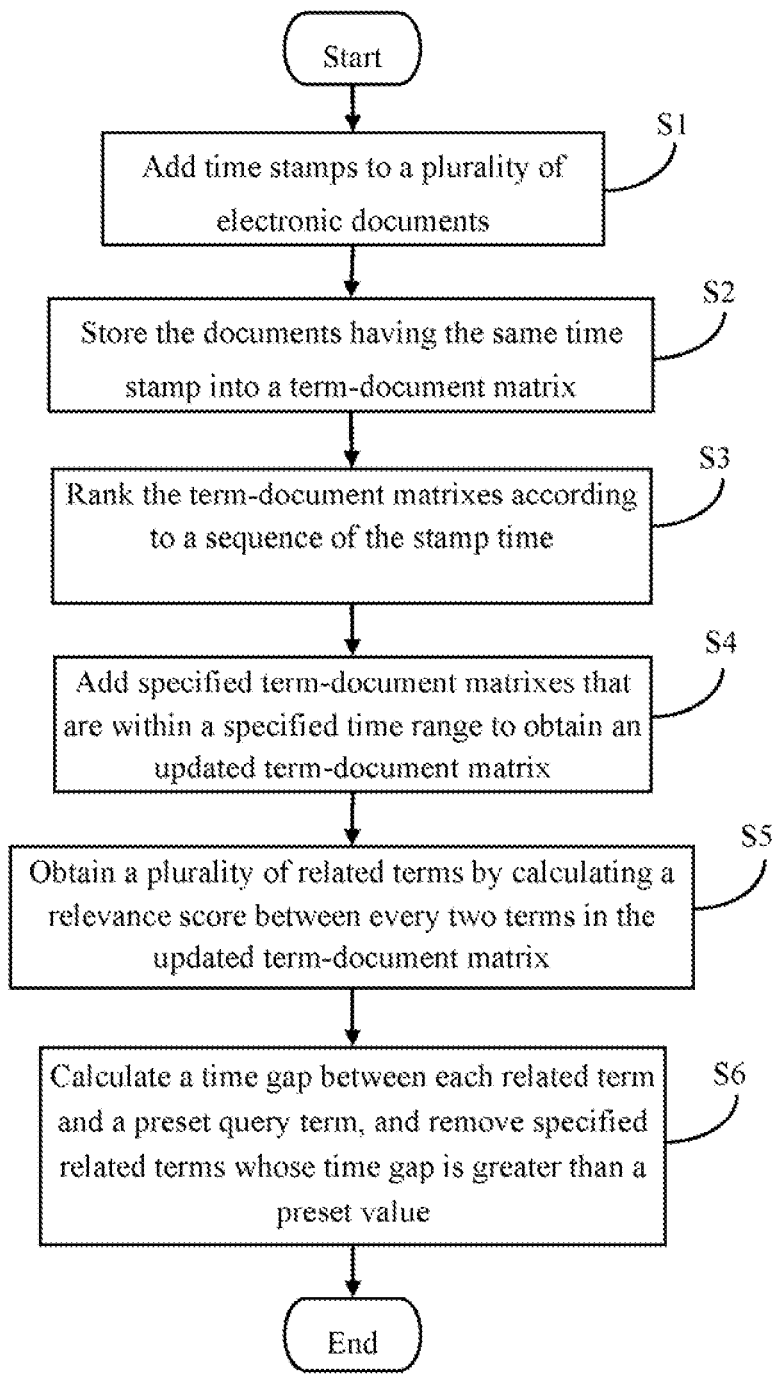
FIG. 3 is a flowchart of one embodiment of a method for searching related terms using the electronic device of the FIG. 1.

FIG. 3 is a flowchart of one embodiment of a method for searching related terms using the electronic device 2. Depending on the embodiment, additional blocks may be added, others removed, and the ordering of the blocks may be changed.

In block S1, the marking module 201 adds time stamps to a plurality of electronic documents (e.g., PDF, WORD). In one embodiment, the time stamp is used to record a created time of an electronic document or a latest updated time of the electronic document. The electronic documents may be stored in the storage device 23 or a remote server. In one example, the time stamps may be embedded in a header of each of the electronic documents, or attached to a file name of each of the electronic documents.

In block S2, the marking module 201 generates a plurality of term-document matrixes according to each of the time stamps, and stores each of the documents having the same time stamp into a term-document matrix or other suitable data structures. In one embodiment, a term-document matrix is a mathematical matrix that describes the frequency of terms that occur in a collection of electronic documents. In a term-document matrix, rows represent the terms, and the columns represent the electronic documents. The elements of the matrix are the number of occurrences of each term in a particular electronic document.

Figure 4:
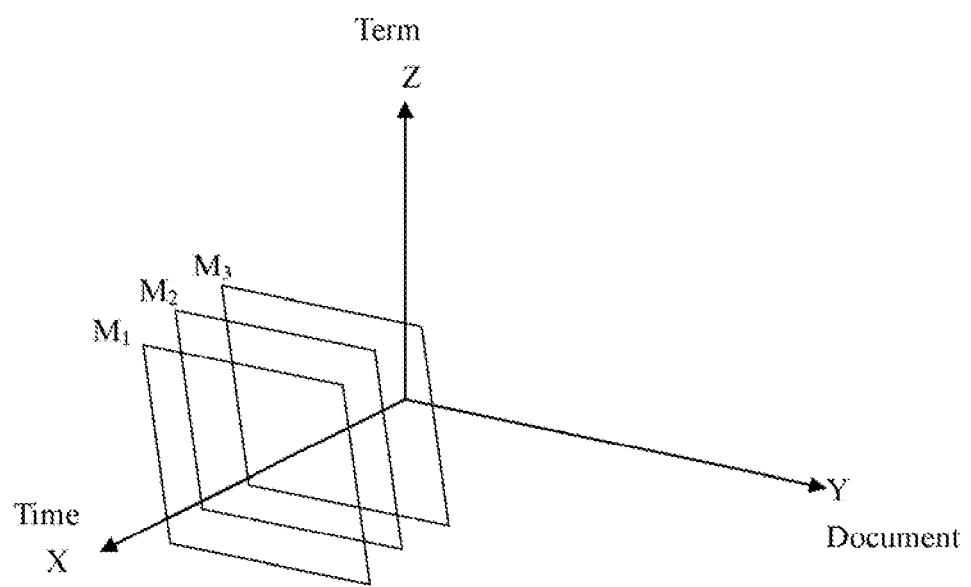
FIG. 4 is an exemplary schematic diagram of a plurality of term-document matrixes ranked in a time sequence.

In block S3, the ranking module 202 ranks the term-document matrixes according to a sequence of the stamp time. As shown in FIG. 4, "$M_1$," "$M_2$," and "$M_3$" represent three term-document matrixes at three different time stamps.

In block S4, the first calculation module 203 adds specified term-document matrixes that are within a specified time range to obtain an updated term-document matrix. In one embodiment, the specified time range is a default value (e.g., a past year) or a user-selected value.

In block S5, the second calculation module 204 obtains a plurality of related terms by calculating a relevance score between every two terms in the updated term-document matrix. In one embodiment, the relevance score is calculated according to an angle between two vectors of every two terms in the updated term-document matrix. For example, suppose that "$V_i$" represents a vector of a first term "Term1," and "$V_j$" represents a vector of a second term "Term2," the relevance score between the two terms "Term1" and "Term2" is defined as a cosine value of the angle between the two vectors "$V_i$" and "$V_j$". The less divergence, or the smaller the angle between the two vectors, the larger the cosine value of the angle is, and the larger the relevance score of the two terms is.

A detailed description of obtaining the vectors of the terms ("term vectors") in the updated term-document matrix is as follows. The second calculation module 204 decomposes the updated term-document matrix into a product form of three matrices using a singular value decomposition (SVD) algorithm. The three matrices include a term vector matrix, a diagonal matrix of the singular values, and a document vector matrix. Each column in the term vector matrix represents a term vector. Each column in the document vector matrix represents a document vector.

In one embodiment, the related terms and the relevance score between every two related terms are obtained using a term-document matrix. In other embodiments, the relevance score between every two terms may be obtained using other methods, so as to obtain the related terms. For example, the second calculation module 204 may obtain the relevance score by calculating a conditional probability between every two terms. Supposing that "$P_{i,j}$" represents a conditional probability between two terms of "$Term_i$" and "$Term_j$", where $P_{i,j}=P((Term_i \cap Term_j)|Term_i)$. For example, assume that an occurrence number of a term "A" is 100, and an occurrence number of a term "B" is 30 given the occurrence of the term "A". Thus, $P(A \cap B)|A)=0.3$, that is, the relevance score from the term "A" to the term "B" is 30%.

In block S6, the third calculation module 205 calculates a time gap between each related term of the updated term-document matrix and a preset query term, and obtains updated related terms by removing specified related terms whose time gap is greater than a preset value (e.g., 5). The updated related terms are used as key words to search files. Then, the searching module 206 performs a search operation according to the updated related terms to obtain search results from a data source, and displays the search results on the display device 20 of the electronic device 2. The data source may be the Internet, at least one database, or at least one file system.

A particular example will be described herein to better explain block S6. Supposing that "$Term_A$" represents a related term, "$Term_B$" represents the preset query term, $Term_i=\{t1, t2, \ldots, tn\}$ represents the term of "$Term_i$" is occurred in the electronic documents at the time of t1, t2, ..., and tn. Supposing that "Gap(A, B)" represents the time gap between "$Term_A$" and "$Term_B$". If $Term_A=\{1, 2, 3\}$, and $Term_B=\{10, 11, 12\}$, thus, Gap(A, B)=min(|1-10|, |2-10|, |3-10|, |1-11|, |2-11|, |3-11|, |1-12|, |2-12|, |3-12|)=min(9, 8, 7, 10, 9, 8, 11, 10, 9)=7. Because the time gap of Gap(A, B) is greater than the preset value (i.e., 5), the related term "$Term_A$" is removed even though the relevance score between "$Term_A$" and "$Term_B$" is very high.

It should be emphasized that one or more stop words are removed from the documents. That is to say, the related terms and the preset query term are not the stop words. In one embodiment, the stop words at least include articles, adverbs, and quantifiers, such as "a", and "the" and "this".

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for searching related terms using an electronic device, the method comprising:
   adding time stamps to a plurality of electronic documents, the time stamps being creation time of the electronic documents or last updated time of the electronic documents;
   generating a plurality of term document matrixes according to each of the time stamps, and storing each of the electronic documents having the same time stamp into a term-document matrix;
   ranking the term-document matrixes according to a sequence of the stamp time;
   adding specified term-document matrixes that are within a specified time range to obtain an updated term-document matrix:
   obtaining a plurality of related terms by calculating a relevance score between every two terms in the updated term-document matrix:
   calculating a time gap between each related term and a preset query term by calculating a minimum time period between a first set of time of each related term occurring in the specified electronic documents and a second set of time of the preset query term occurring in the specified electronic documents, and obtaining updated related terms by removing specified related terms whose time gap is greater than a preset value; and
   obtaining search results from a data source by performing a search operation according to the updated related terms, and displaying the search results on a display device of the electronic device.

2. The method according to claim 1, wherein the relevance score is calculated according to an angle between two vectors of every two terms in the updated term-document matrix.

3. The method according to claim 2, wherein the relevance score is a cosine value of the angle.

4. The method according to claim 3, wherein the vectors of the terms in the updated term-document matrix are obtained by decomposing the updated term-document matrix into a product form of three matrices using a singular value decomposition algorithm, the three matrices comprising a term vector matrix, a diagonal matrix, and a document vector matrix, wherein each column in the term vector matrix represents a term vector, and each column in the document vector matrix represents a document vector.

5. The method according to claim 1, wherein the related terms are obtained by calculating a conditional probability between every two terms of the electronic documents.

6. An electronic device, comprising:
   a storage device;
   at least one processor; and
   one or more modules that are stored in the storage device and are executed by the at least one processor, the one or more modules comprising instructions:
   to add time stamps to a plurality of electronic documents, the time stamps being creation time of the electronic documents or last updated time of the electronic documents;
   to generate a plurality of term-document matrixes according to each of the time stamps, and store each of the electronic documents having the same time stamp into a term-document matrix;
   to rank the term document matrixes according to a sequence of the stamp time:
   to add specified term-document matrixes that are within a specified time range to obtain an updated term-document matrix;

to obtain a plurality of related terms by calculating relevance score between every two terms in the updated term-document matrix;

to calculate a time gap between each related term and a preset query term by calculating a minimum time period between a first set of time of each related term occurring in the specified electronic documents and a second set of time of the preset query term occurring in the specified electronic documents, and obtain updated related terms by removing specified related terms whose time gap is greater than a preset value; and to obtain search results from a data source by performing a search operation according to the updated related terms; and display the search results on a display device of the electronic device.

7. The electronic device according to claim 6, wherein the relevance score is calculated according to an angle between two vectors of every two terms in the updated term-document matrix.

8. The electronic device according to claim 7, wherein the relevance score is a cosine value of the angle.

9. The electronic device according to claim 8, wherein the vectors of the terms in the updated term-document matrix are obtained by decomposing the updated term-document matrix into a product form of three matrices using a singular value decomposition algorithm, the three matrices comprising a term vector matrix, a diagonal matrix, and a document vector matrix, wherein each column in the term vector matrix represents a term vector, and each column in the document vector matrix represents a document vector.

10. The electronic device according to claim 6, wherein the related terms are obtained by calculating a conditional probability between every two terms of the electronic documents.

11. A non-transitory storage medium having stored thereon instructions that, when executed by a processor of an electronic device, causes the electronic device to perform a method for searching related terms, the method comprising:

adding time stamps to a plurality of electronic documents, the time stamps being creation time of the electronic documents or last updated time of the electronic documents;

generating a plurality of term-document matrixes according to each of the time stamps, and storing each of the electronic documents having the same time stamp into a term-document matrix;

ranking the term-document matrixes according to a sequence of the stamp time;

adding specified term-document matrixes that are within a specified time range to obtain an updated term-document matrix;

obtaining a plurality of related terms by calculating a relevance score between every two terms in the updated term-document matrix;

calculating a time gap between each related term and a preset query term by calculating a minimum time period between a first set of time of each related term occurring in the specified electronic documents and a second set of time of the preset query term occurring in the specified electronic documents and obtaining updated related terms by removing specified related terms whose time gap is greater than a preset value; and obtaining search results from a data source by performing a search operation according to the updated related terms, and displaying the search results on a display device of the electronic device.

12. The non-transitory storage medium according to claim 11, wherein the relevance score is calculated according to an angle between two vectors of every two terms in the updated term-document matrix.

13. The non-transitory storage medium according to claim 12, wherein the relevance score is a cosine value of the angle.

14. The non-transitory storage medium according to claim 13, wherein the vectors of the terms in the updated term-document matrix are obtained by decomposing the updated term-document matrix into a product form of three matrices using a singular value decomposition algorithm, the three matrices comprising a term vector matrix, a diagonal matrix, and a document vector matrix, wherein each column in the term vector matrix represents a term vector, and each column in the document vector matrix represents a document vector.

15. The non-transitory storage medium according to claim 11, wherein the related terms are obtained by calculating a conditional probability between every two terms of the electronic documents.

16. The non-transitory storage medium according to claim 11, wherein the medium is selected from the group consisting of a hard disk drive, a compact disc, a digital video disc, and a tape drive.

* * * * *